Figure 3:
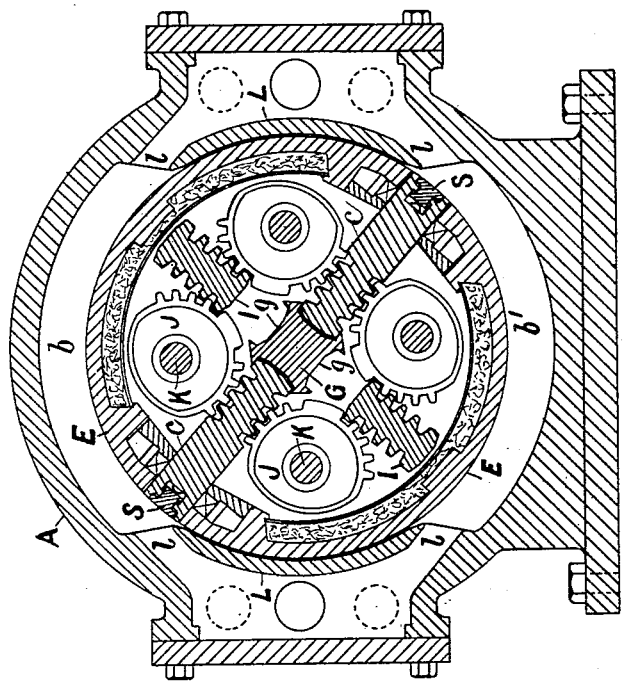

No. 745,820. PATENTED DEC. 1, 1903.
W. H. GREENE.
ROTARY ENGINE.
APPLICATION FILED MAR. 18, 1903.
NO MODEL. 6 SHEETS—SHEET 1.
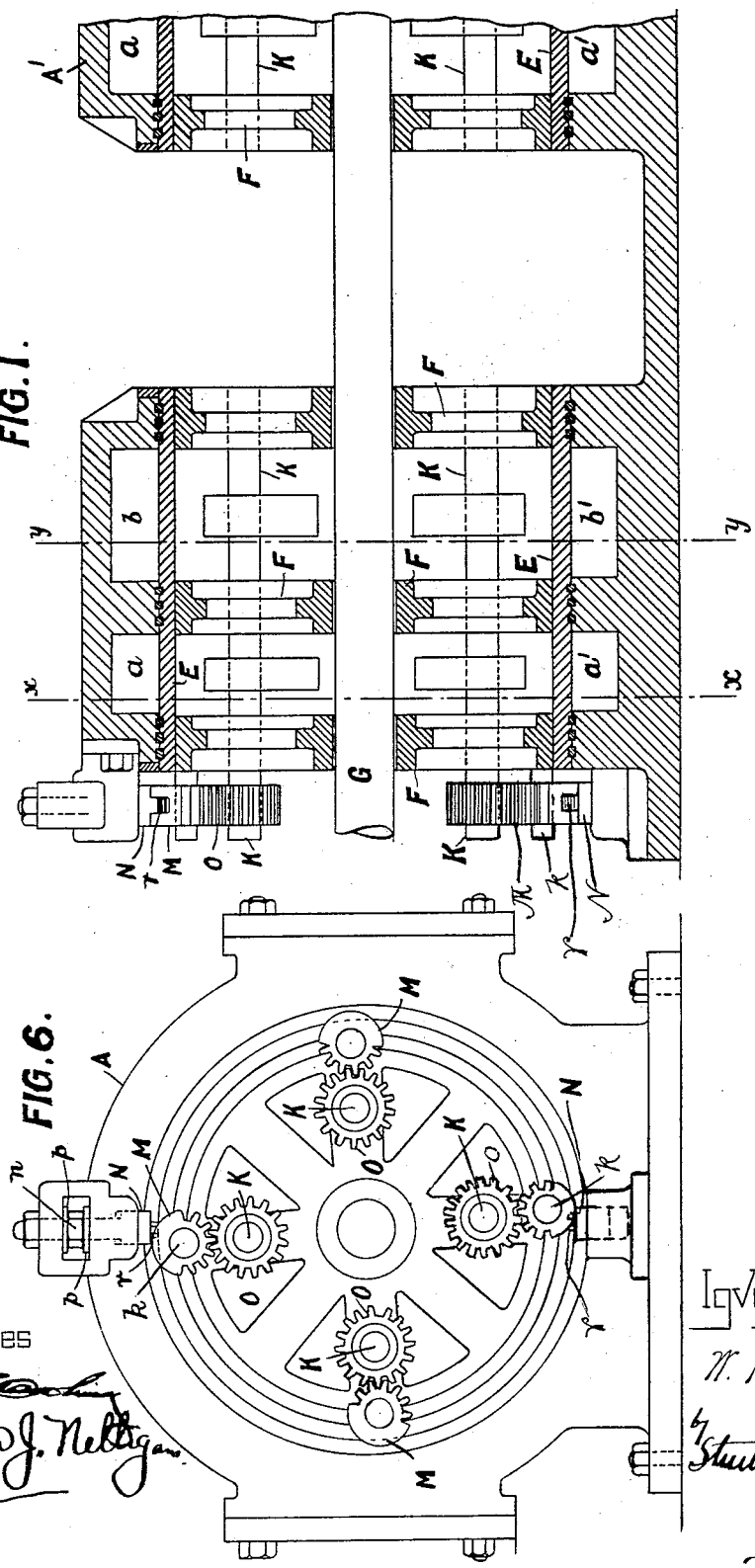

No. 745,820. PATENTED DEC. 1, 1903.
W. H. GREENE.
ROTARY ENGINE.
APPLICATION FILED MAR. 18, 1903.
NO MODEL. 6 SHEETS—SHEET 2.
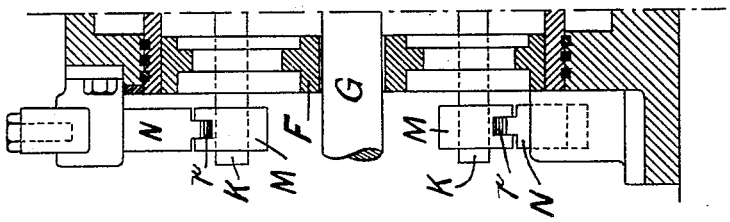
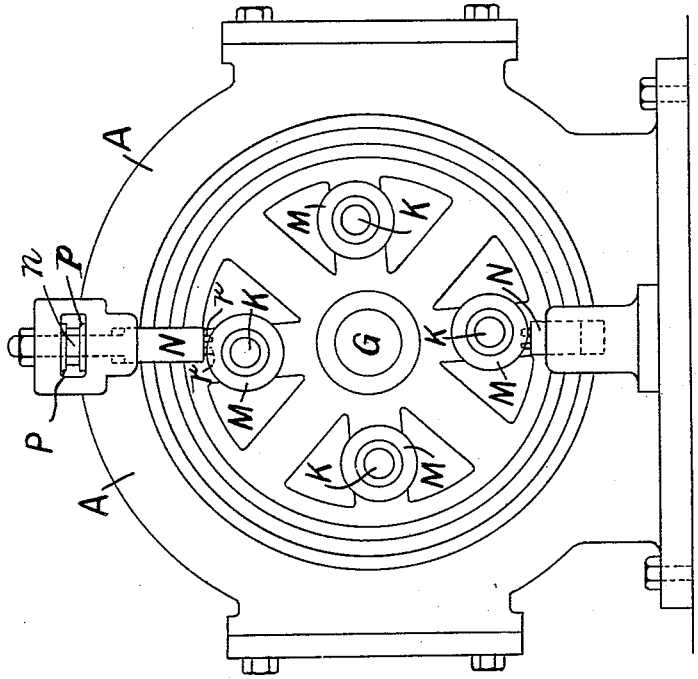
Witnesses
Albert Popkins
Ralph S. Warfield
Inventor
William H Greene
by Sturtevant & Greeley
Attorneys No. 745,820. PATENTED DEC. 1, 1903.
W. H. GREENE.
ROTARY ENGINE.
APPLICATION FILED MAR. 18, 1903.
NO MODEL. 6 SHEETS—SHEET 3.

Witnesses
John J. Nelligan

Inventor
W. H. Greene
by Sturtevant & Grubey
Attys.

No. 745,820. PATENTED DEC. 1, 1903.
W. H. GREENE.
ROTARY ENGINE.
APPLICATION FILED MAR. 18, 1903.
NO MODEL. 6 SHEETS—SHEET 4.

Witnesses
John J. Nelligan

Inventor
W. H. Greene
by Sturtevant & Greely
Att'ys.

No. 745,820. PATENTED DEC. 1, 1903.
W. H. GREENE.
ROTARY ENGINE.
APPLICATION FILED MAR. 18, 1903.
NO MODEL. 6 SHEETS—SHEET 5.

Witnesses
John J. Nelligan

Inventor
W. H. Greene
by Sturtevant & Greeley
Attys.

No. 745,820. PATENTED DEC. 1, 1903.
W. H. GREENE.
ROTARY ENGINE.
APPLICATION FILED MAR. 18, 1903.
NO MODEL. 6 SHEETS—SHEET 6.

Witnesses
Inventor
W. H. Greene
by Sturtevant & Greeley
Attys.

No. 745,820. Patented December 1, 1903.

UNITED STATES PATENT OFFICE.

WILLIAM HOWE-GREENE, OF ST. JOHN'S, NEWFOUNDLAND.

ROTARY ENGINE.

SPECIFICATION forming part of Letters Patent No. 745,820, dated December 1, 1903.

Application filed March 18, 1903. Serial No. 148,366. (No model.)

*To all whom it may concern:*

Be it known that I, WILLIAM HOWE GREENE, architect, a subject of the King of Great Britain, residing at St. John's, Newfoundland, (whose full postal address is Duckworth street, St. John's, aforesaid,) have invented certain new and useful Improvements in Rotary Engines, (for which application has been made in Great Britain, No. 18,147, dated August 18, 1902,) of which the following is a specification.

This invention relates to rotary engines applicable to be driven by steam, water, or other fluid, and has for its object to provide an efficient and reliable motor of this type.

According to my invention I provide one or more wheel-like bodies or other revoluble members or motors adapted to be rotated on a shaft, and I fit each one with solid or built rim or periphery provided with apertures at certain points. I provide each motor with various slides, which are capable of being moved radially in and out through these apertures in rim and which when extended beyond rim are actuated on by steam or other fluid power and produce rotation. I connect these slides with gearing or other means adapted to be actuated by the rotation of the engine, and which gearing shifts the slides in or out in the radial direction referred to, and there may be various combinations of slides and gearing. Any desired number or size of slides can be used, and they can be arranged (by adjusting-gearing) to be projected to any desired extent through the rim. These revoluble members or wheels will be each placed within a suitable "caisson" or enveloping casing, and entire wheels or revoluble members may be of any number, diameter, or sizes, according to power and description of engine required. The enveloping casing will be provided with a desired number of inlet and exhaust ports for the steam or other working fluid and which will be formed or provided in projections on the casing, such projections lying in the path of the slides at desired points and forming abutments, the slides themselves being so adjusted, as will be hereinafter explained, to move inward and outward to clear said abutments. The peripheral contour of the track or enveloping part of the casing will be varied, as required, to attain the desired object and to suit the number of slides used. Where a track is formed to assist the positive mechanical adjustment (to be hereinafter described) of the slides, such track may take the form of a circle, eccentric or concentric to the axis of rotation, or be formed sinuous or of any other known form adapted to facilitate the slides riding over the innermost points of it without undue shock. The radial movement of slides will work independently of the track formation of the enveloping caisson or casing, but is also assisted by same. The steam or other fluid power will also aid in effecting such movement, and use is made of centrifugal force and other natural forces. By these means the slides can be made themselves to counterbalance their own weights and movements and to effect an absolute and relative movement.

The machine may be formed for a simple action by arranging a single revoluble body with the various mechanical and other parts, as hereinafter described, or a number of such bodies may be mounted side by side on the same shaft, so as to rotate independently or together on the same shaft. Also I provide a compound arrangement by mounting two or more revoluble members on the same shaft with different capacities for steam or other fluid and in such a way that by a suitable arrangement of valves the fluid admitted into one body may be exhausted into the other or others and worked expansively on the compound principle.

The machine may be made to reverse or be formed for rotation in one direction only.

The invention will be described with reference to the accompanying drawings, in which—

Figure 2:
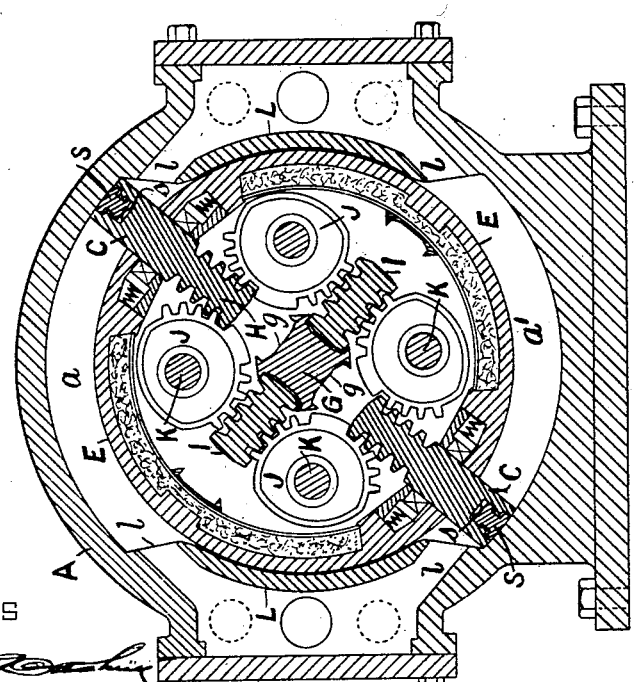
Figure 5:
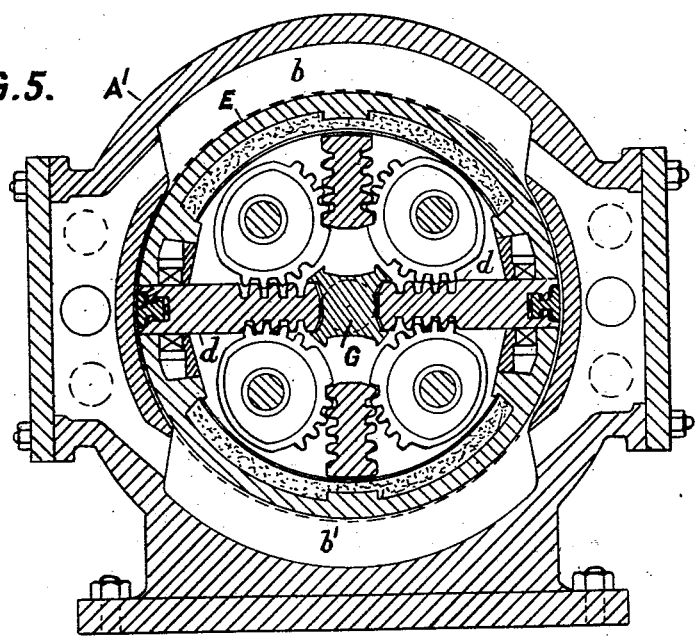
Figure 4:
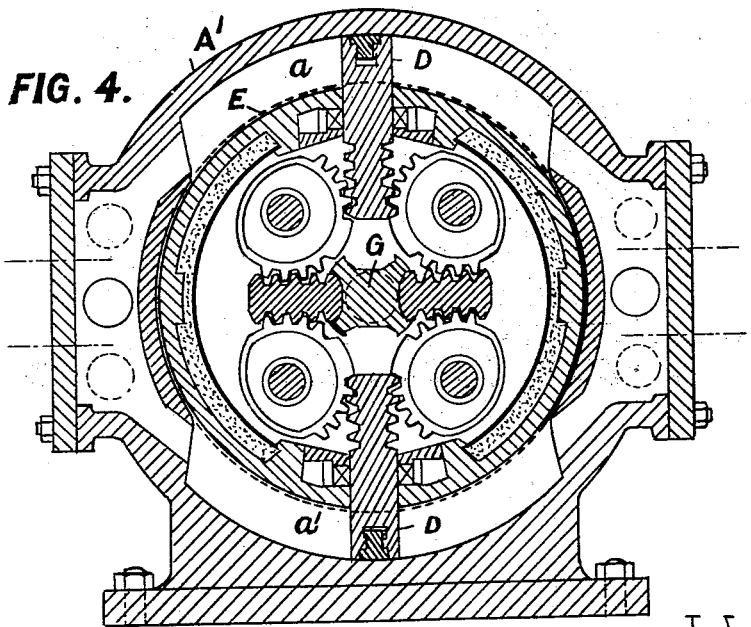
Figure 9:
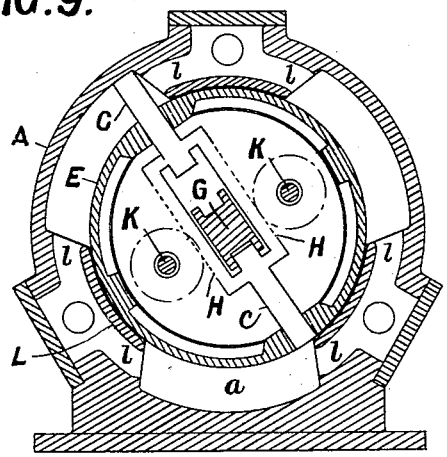
Figure 7:
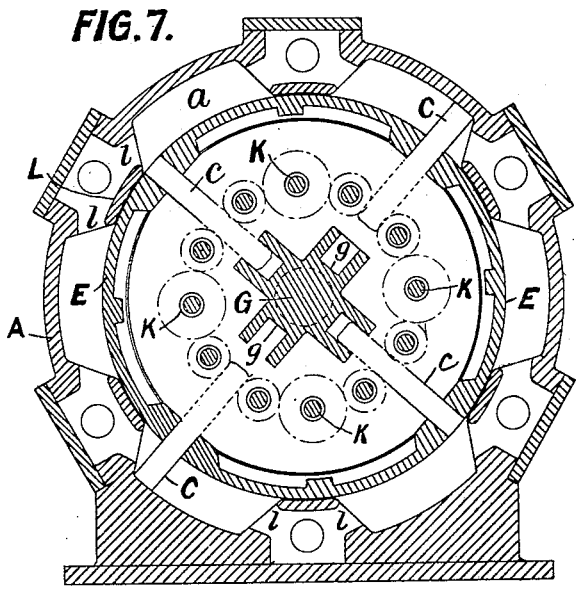
Figure 8:
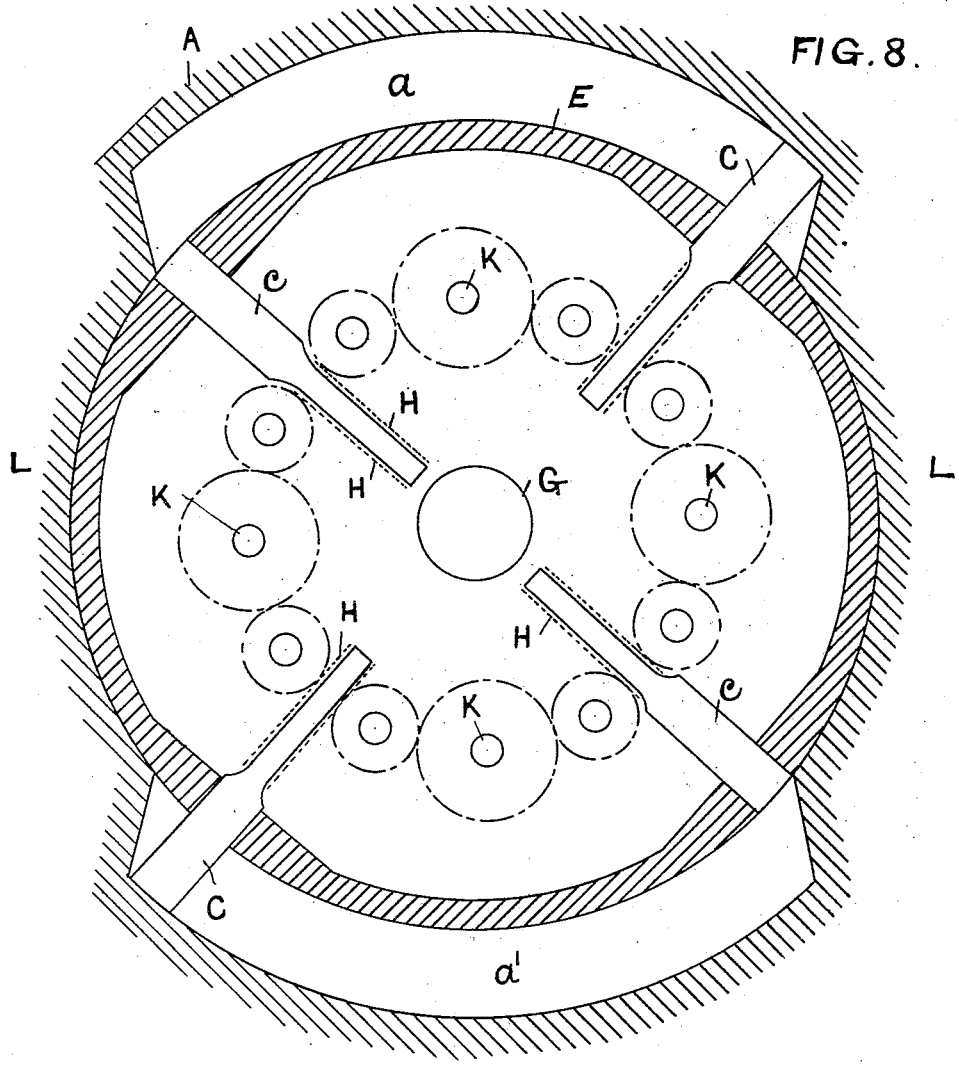
Figure 10:
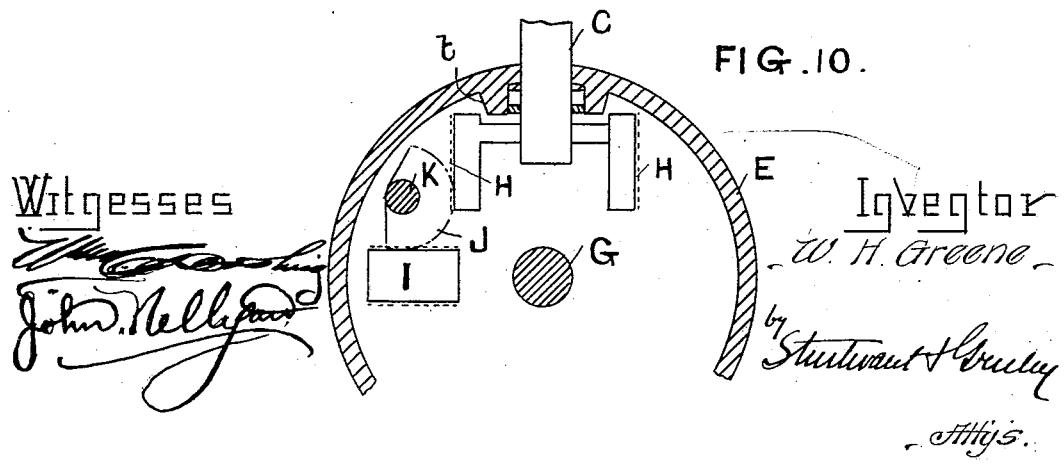

Figure 1 is a partial view in longitudinal section of a rotary engine provided with the improvements of my invention, showing casing with tracks in different planes for two related sets of slides. Fig. 1ª is a fragmentary view of a portion of Fig 1, showing a modification. Figs. 2 and 3 are transverse sections on the lines $x$ $x$ and $y$ $y$ of Fig. 1, showing the positions of the slides of one set relative to those of the other set. Figs. 4 and 5 are similar views of another double set of slides, showing relative positions for acting in conjunction with the first double set on the same shaft. Fig. 6 is an end elevation of Fig. 1, showing the mechanism for operating the slides. Fig. 6ᵃ is a view similar to Fig. 6, but showing a modification. Figs. 7 and 8 are transverse sections of casings with tracks having six and two depressions, respectively, and showing operating mechanism arranged for alternate projection or retraction of the slides of two sets arranged in the same plane or track. Figs. 9 and 10 are similar views showing modified construction of slides.

A, Figs. 1, 2, and 3, is a casing provided, for example, with two depressions $a\ a'$, forming a circular track for one set of slides C C, Fig. 2, and two depressions $b\ b'$, forming a track in a different plane for a related second set of slides $c\ c$, Fig. 3. The two sets of slides C and c are mounted radially movable in apertures in a rim E, which is fixed to disks or wheel-like carriers F, mounted on a main shaft G. The rim E and carriers F constitute a revoluble body, which is either fast on the shaft G or loose thereon and adapted to be clutched to it when required by ordinary clutch mechanism. This revoluble body E F, with the two sets of slides C c and the casing A, are adapted to constitute a complete motor.

I form or provide the portion of each slide that is within the periphery of the rim E with racks H on two sides. I also mount a plurality of parallel shafts K in the carriers F of each revoluble body and provide these shafts with sectors or gear-wheels J to gear with the racks H in such a way that each slide is engaged between a pair of wheels J. Between each pair of wheels J, as shown in Figs. 2 and 3, I provide radially-movable pieces I, which are formed or provided with racks on two sides similarly to the slides C c, so that each radial piece I is engaged by two gear-wheels J. The shafts K for the wheels J of one set of slides C, Fig. 2, are continuous with those for the second set of slides c, Fig. 3, so that all slides and intermediate gear in one complete motor are compelled to move if any one be moved. By means of this intermediate gear no slide can move without the others also move, the parts being so assembled that some slides are fully inward, as shown, for instance, in Fig. 3, and some fully outward, as shown, for instance, in Fig. 2, or otherwise occupy the relative positions one to another necessary in rotary engines, according to the disposition and arrangements of the power-ports. I may, however, use levers or other known or suitable gearing adapted to insure in like manner that no slide can move without the others also move.

In some cases I may arrange a number of complete motors to coact on the same shaft G. This is shown in Fig. 1, in which A' is a second casing containing a revoluble body E F, with two sets of slides D and d and intermediate gear in a similar manner to the casing A, both motors A A' being adapted to act in conjunction or either of them be thrown out of action in any known manner. When two such motors are used in conjunction either on the compound or other system, it is preferable that the slides C c of the motor A' should occupy different angular positions relative to the slides D d of the motor A, as is shown, for example, in Figs. 2 to 5.

The caissons or casings A A', Figs. 1 to 5, are provided with any suitable or desired number of ports $l$ for inlet and exhaust of steam or other working fluid, which ports may be formed or provided, for instance, in projections on the casing, such projections lying in the track of the slides at desired points and constituting abutments L, which may, for example, be formed by making the track for the slides in the form of depressions $a\ a'$, Fig. 2, and $b\ b'$, Fig. 3.

The slides themselves are shifted radially inward and outward to clear the abutments L in a positive manner by the provision of means whereby the interconnecting gear-wheels J are caused to revolve at required intervals and by revolving cause the connected slides to move in either inward or outward direction, according to the arrangement and number of wheels J provided and direction of their rotation. I cause the revolution of these gear-wheels J by utilizing the revolution of the machine itself, as will be now described, and thus the position of the slides will also be varied and controlled by the revolution of the machine. Movement will be effected apart from but assisted by, if necessary, the engagement of the slide ends on the track of the casing, which latter will be shaped to the exact course the slides are required to take in their movement.

One method of shifting the slides consists as follows: On the shafts K outside the revoluble body I provide friction-wheels M, as shown in Figs. 1ᵃ and 6ᵃ, or I may mount these friction-wheels M on separate shafts $k$, as shown in Figs. 1 and 6, to gear with gear-wheels O, mounted on the shafts K. N represents friction-blocks mounted stationary at desired points on the casing and in the path of the friction-wheels M to engage alternate friction-wheels M as the motor rotates. By this engagement the friction-wheels are forced to revolve, and the shafts K are thus caused to turn the wheels J, Figs. 2 and 3, and shift the slides, some inward and others outward, as before described, the friction-blocks being placed to engage the friction-wheels at the exact point in the revolution of the motor when this shifting of the slides is desired to take place. As only alternate friction-wheels engage the friction block or blocks at any given moment, it follows that the successive engagement of the next succeeding friction wheel or wheels on the same or another friction block or blocks will move the slides in the reverse direction to that due to the previous engagement. That this must be the case will be evident on referring to Figs. 2 and 6, as by reason of the intermediate racks H and I being each engaged by the opposite sides of two wheels J the latter cannot all rotate in the same direction at the same time, but only alternate ones, and consequently a successive operation of the several shafts K by the friction-gear M N always in one direction must of necessity reverse the movement of the slides on each successive engagement of the friction-wheels.

The friction-blocks N are rigid but adjustable by screw and nut n, Fig. 6, or like device, and I mount them on springs or pads P, so as to have a slight yielding action when contact takes place. Further, I may provide the friction wheels and blocks with a combined arrangement of toothed and frictional surface, as shown in Figs. 1 and 6, the teeth r being designed to engage as revolution takes place. The frictional surface of the friction-wheels in such case first comes in contact with the frictional surface of the friction-blocks and on rotation ensuing the teeth r provided in each will engage and prevent slip without the shock of toothed surfaces coming directly in contact. Any desired number of stationary friction-blocks may of course be used and on either or both sides of the motors. Also one or more friction-wheels may be inserted between any two sets of slides, as desired, for effecting movement according to the design of engine.

When the friction-wheels M are mounted to gear with wheels O on the shafts K, as before described, instead of being mounted directly on the shafts K the amount of projection of the slides may be varied as desired by selecting wheels M and O of the required relative diameters to produce a greater or lesser rotation of the shafts K.

Instead of the frictional devices described I may use a cam in place of the friction-wheels and a fixed projection in place of the friction-block in such a way that the cam striking against the projection will be forced round and similar movements produced to those before described. Any other mechanical means of producing a like movement may also be used.

The ends of the slides are fitted with movable caps S, which are normally pressed outward by springs s to form a steam-joint against the track of enveloping-casing A during rotation of the motor, the cap S being of sufficient width to form a steam-joint and being kept in position by projections on the inner edges of same moving in slots in the slide ends. The springs also act as a buffer as the slide completes its extension. Compression of steam or other working fluid may be utilized by permitting escape of same through suitable channels in the slides to the inner part of the cap S to force same outward. The sides of the slides touching the casing may be formed with sufficient fit thereto to form adequate steam-joint, or suitable packing may be inserted in slides, if desired.

In some cases I also provide an air-cushion for the slides by forming small chambers g on the shaft G, into which the inner ends of the slides are adapted to fit with a cushioning effect when the same are retracted, the outer ends of the slides being cushioned by the spring-mounted caps S, before described, when the slides are projected. The sliding pieces I are similarly provided with air-cushions in the shaft G and in some cases may be provided with air-cushions on the inner face of the rim E for the outer ends of said pieces, as shown in Fig. 2, in order to prevent shock from the latter against the rim E.

The movement of the slides and rotation of the gear-wheels is effected and assisted both first, mechanically; second, by action of slide ends on casing; third, by steam or other fluid acting on ends of slide as soon as withdrawn from track; fourth, by pressure of spring in cap S against the track, and, fifth, by the air-cushion g, that is formed on the main shaft on movement inward of the slides. These will all assist each other and being themselves assisted by the centrifugal force engendered in rotation there will be needed but little mechanical force to effect movement.

It will be seen that there will be no great consumption of energy absorbed in moving the slides, as the fluid-pressure itself acts in conjunction with the rotation of the engine to assist in moving the slides while the said movement and weight of the slides are balanced one against the other, as before noted. Moreover, as soon as a slide has commenced its inward course the steam or other fluid pressure acting over it as the top of the slide, is exposed by withdrawal from the track assists in the movement not only of this slide but by means of the intergearing also assists in the outward movement of its related slide. There will be no pressure on the slides as they move to project, as all or nearly all steam or other working fluid will have been exhausted at this point and is not allowed to reënter until full projection is on the point of attainment.

The various ports for inlet and exhaust of steam or other working fluid are provided with any usual or suitable arrangement of valves with ordinary valve-operating mechanism adapted to be controlled or actuated by the rotation of the engine in such a manner as to open and close these ports according to the system on which the engine is to be worked either in a simple manner or expansively or on the compound principle.

The mode of action is as follows: In the form shown in Figs. 1 to 5 two or more sets of slides acting in the manner described to form a complete motor will be required. Instead of two slides in each set, as shown, the number of same may be increased, as desired, but geared in pairs, as shown. Owing to the interconnecting gear between the slides of both sets C and c it follows, as before described, that the slides of one set, C, will move in the opposite direction to that in which the other set of slides, *c*, move. All slides are relatively all withdrawn in the one set and all extended in the other set in each related double set of slides. The steam enters the high-pressure motor A from the boiler, impacts on one set of slides, C, is cut off at desired point by the valves, expands as slides are forced inward till end of stroke of the slides is reached. The extended slides are now withdrawn from the track by the positive mechanical operation before described, the steam acting on exposed end of same by forcing them inward, while the connected related set of slides *c* consequently are extended. The steam or other working fluid now impacts on these latter slides, and the operation proceeds in like manner, the exhaust being effected on any required system.

In the form shown in Figs. 7 and 8 both sets of slides C *c* are mounted in the same plane instead of different planes, as in the previously-described example, in which case the intermediate sliding pieces I or dummy slides described in reference to Figs. 2 and 3 are replaced by actual working slides *c*, Figs. 7 and 8, and the slides being geared together by gear-wheels, as shown, in such a way that the set of slides C and the set of slides *c* are compelled to move in opposite directions, and no one slide can move without the others also move in exactly the same manner as the before-described form. Fig. 7 shows the slides arranged to work in a track consisting of six depressions *a* in the casing A, which has correspondingly six abutments L, while Fig. 8 shows the same disposition of slides for a track formed by only two depressions *a a'*, and consequently two abutments L.

In the form shown in Fig. 9 a slide C of one set may be arranged diametrically opposite a slide *c* of another set and the two slides formed integrally or rigidly connected one to another in such a way that the slide C moves outward when the slide *c* moves inward, or vice versa. This form shows, for example, two slides acting in conjunction with a track of three depressions *a* in the casing A, and consequently three abutments L.

The form shown in Fig. 10 is the same as that shown in Figs. 2 to 5 except that the racks H are shown extended out from the slides to clear the gland *t* of the slide C, thus enabling a longer rack to be used and a greater amount of projection of slide attained.

When the engine is used as a gas or oil or vapor engine worked by explosion, a suitable explosive mixture is admitted under pressure or otherwise into the vacant spaces left in the depressions in the track behind those slides which have been fully projected, and such gas is exploded by electric ignition or otherwise, using ordinary known arrangements as used on gas-engines.

It will be readily understood that this invention is not limited to the details of construction named, as such may be modified according to requirements without departing from the spirit of the invention.

I declare that what I claim is—

1. In a rotary engine, the combination with radially-movable slides, of means for interconnecting same, said means consisting of toothed gearing adapted to force all slides to move when any one moves, substantially as described.

2. In a rotary engine, the combination with radially-movable slides of means for interconnecting same said means consisting of toothed gearing adapted to force all related slides to move when any one moves, substantially as described.

3. In a rotary engine, the combination with radially-movable slides, of means for interconnecting same, said means consisting of toothed gearing adapted to force all related slides to move, some inward and others outward, when any one moves, substantially as described.

4. In a rotary engine, the combination with radially-movable slides, of means for interconnecting same, said means being adapted to force all slides to move, some inward and others outward, when any one moves, and means exterior of the track adapted to be actuated by the rotation of the engine for effecting such movements at desired points of rotation, substantially as described.

5. In a rotary engine, the combination of radially-movable slides assembled in two related sets one set being adapted to be projected when the other set is retracted and means for interconnecting the slides of both sets, said means consisting of toothed gearing adapted to force all slides of one set to move outward, and simultaneously all slides of the other set to move inward, when any one slide of either set moves, substantially as described.

6. In a rotary engine, the combination of radially-movable slides assembled in two related sets, one set being revoluble in a different plane to that of the other set, but with the rotation axes of both sets coincident, and means for interconnecting the slides of both sets, said means being adapted to force all slides of one set to move outward, and simultaneously all slides of the other set to move inward, when any one slide of either set moves, substantially as described.

7. In a rotary engine, the combination of radially-movable slides assembled in two related sets, one set being adapted to be projected when the other set is retracted, means for interconnecting the slides of both sets, said means being adapted to force all slides of one set to move outward, and simultaneously all slides of the other set to move inward, when any one slide of either set moves, and means exterior of the track adapted to be actuated by the rotation of the engine for effecting such movements at desired points of rotation, substantially as described.

8. In a rotary engine, the combination of radially-movable slides assembled in two related sets, one set being revoluble in a different plane to that of the other set, but with the rotation axes of both sets coincident, means for interconnecting the slides of both sets, said means being adapted to force all slides of one set to move outward and simultaneously all the slides of the other set to move inward, when any one slide of either set moves, and means actuated by the rotation of the engine for effecting such movements at desired points of rotation, substantially as described.

9. In a rotary engine, the combination with radially-movable slides, of means for interconnecting same, said means comprising toothed gearing adapted to force all slides to move some inward and some outward when any one moves, substantially as described.

10. In a rotary engine, the combination of a casing having a track for motor-slides, a revoluble body in said casing, a plurality of slides radially movable in said body to project into or retract from said track, a plurality of parallel shafts longitudinally mounted in the revoluble body, toothed gearing interconnecting said shafts and slides, the interconnection being adapted to force all slides to move some inward and others outward when any one moves, and means actuated by the rotation of the engine adapted to rotate the said shafts successively to effect said movements of the slides at desired points of rotation, substantially as described.

11. In a rotary engine, the combination of a casing having a track for motor-slides, a revoluble body in said casing, a plurality of slides radially movable in said body to project into or retract from said track, a plurality of parallel shafts longitudinally mounted in the revoluble body, toothed wheels on said shafts, rack-teeth on said slides in gear with said toothed wheels in pairs, and intermediate racks between each pair of toothed wheels, the interconnection being adapted to force all slides to move some inward and others outward when any one moves substantially as described.

12. In a rotary engine, the combination of a casing having a track for motor-slides, a revoluble body in said casing, a plurality of slides radially movable in said body to project into or retract from said track, a plurality of parallel shafts longitudinally mounted in the revoluble body, toothed gearing interconnecting said shafts and slides, the interconnection being adapted to force all slides to move some inward and others outward when any one moves, and means for moving the slides comprising traveling and stationary members, the traveling members being mounted exterior of the revoluble body, to travel with the latter and rotate the said shafts when engaged by the stationary members, and the stationary members being adapted to engage said traveling members successively to rotate the said shafts successively and effect said movements of the slide at desired points of rotation, substantially as described.

13. In a rotary engine, the combination with the shaft, a revoluble body thereon, and a plurality of slides radially movable in said body, of toothed gearing interconnecting all the slides, and means for air-cushioning both the retraction of the slides and the movements of the said interconnecting gear, substantially as described.

14. In a rotary engine, the combination with the revoluble body having radially-movable slides, of shafts K, gear-wheels O and friction-gear M N, substantially as and for the purpose set forth.

15. In a rotary engine, the combination with a casing having slide-tracks and abutments, of revoluble body E, slides C and c therein having rack-teeth H shafts K, toothed wheels J thereon, intermediate racks I, and means for partially rotating the shafts K successively substantially as and for the purpose set forth.

16. In a rotary engine, the combination with a revoluble body of slides radially movable therein, racks on said slides, said racks forming a rigid connection of two diametrically opposite slides, toothed wheels in gear with said racks, and means actuated by the rotation of the engine to impart partial rotations to said wheels successively to project the slide at one end and retract the slide at the other end of said racks at desired points in the rotation, substantially as described.

17. In a rotary engine, the combination with the revoluble body having radially-movable slides, and means for interconnecting all the slides, of friction-gear having combined frictional and toothed engaging surfaces adapted to operate said slides in the manner, substantially as described.

In witness whereof I have hereunto signed my name, this 10th day of March, 1903, in the presence of two subscribing witnesses.

WILLIAM HOWE GREENE.

Witnesses:
 WILLIAM M. CLAPP,
 CYRIL J. CAHILL.